Patented Mar. 5, 1940

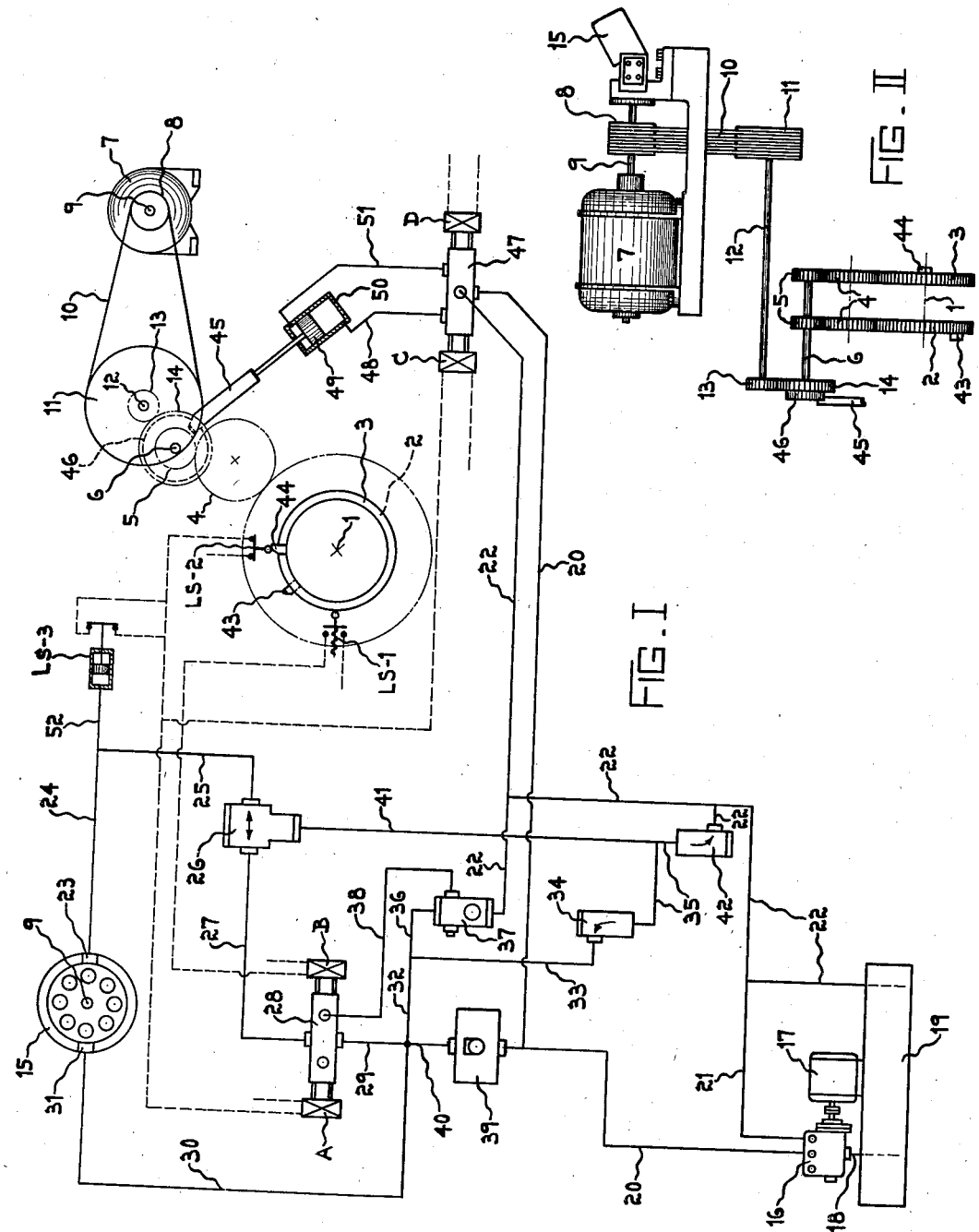

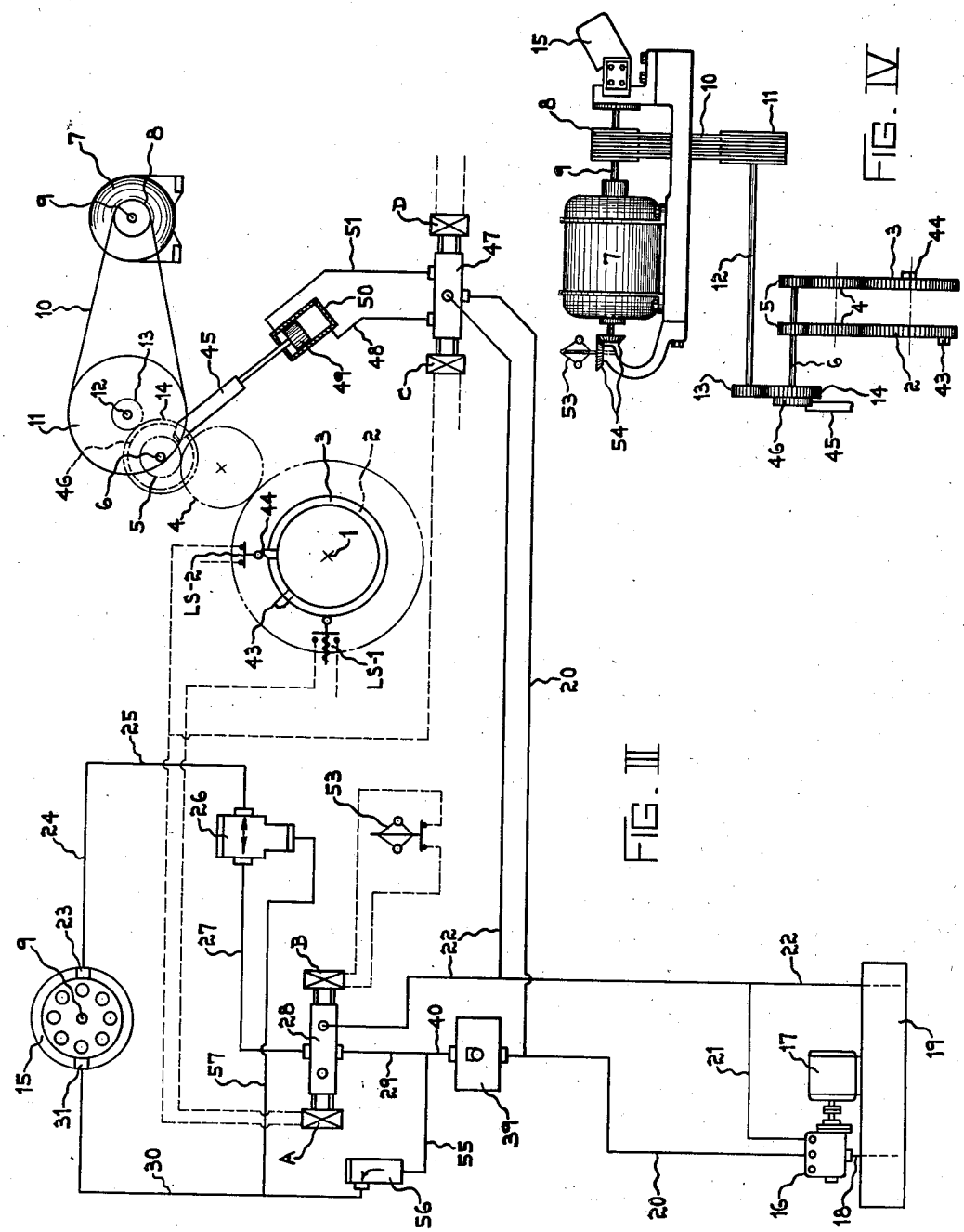

2,192,437

UNITED STATES PATENT OFFICE 2,192,437

SPINDLE CONTROL MECHANISM

William F. Groene and Harold J. Siekmann, Cincinnati, Ohio, assignors to The R. K. Le Blond Machine Tool Company, Cincinnati, Ohio, a corporation of Delaware Application May 20, 1938, Serial No. 209,026

16 Claims. (Cl. 82—2)

This invention pertains to spindle control mechanism for machine tools and more particularly to the stopping of rotating work spindles at the completion of a cutting cycle and to provide means for inching or jogging the work spindle when setting the cutting tools. This application involves certain improvements and additions to mechanism of a character shown in co-pending application Serial Number 169,551, filed October 18, 1937.

Heretofore it has always been difficult to stop a rotating work spindle quickly and smoothly at a predetermined position for loading and unloading work. This had formerly been done by using a friction brake in connection with the electric driving motor which arrangement was very unsatisfactory because the friction constant of such a brake could not be relied upon to stop the spindle regularly at a definite predetermined position. And another method formerly used was that of electro-dynamically braking the main electric driving motor by reversing the current supply to the motor when operating. This latter method has likewise proved quite unsatisfactory because of the violent torque reactions set up in the driving transmission and the motor armature causing frequent damage and breakage of these parts. Jogging operations effected by intermittently energizing and de-energizing the main driving motor likewise sets up severe jolting in the machine and gave no end of trouble so far as the line contactors and relays for controlling the electrical circuits for the main motor were concerned. This latter electro-dynamic method also was very unsatisfactory in that accurate stopping of the work spindle at an accurate predetermined position could not be obtained because the sequence of operation of the various electrical devices necessary to stop the main motor was dependent upon the friction or coasting characteristics of the machine between the time power was cut off from the main motor and the reverse electro-dynamic braking current was applied to it and because of the great variations in line voltages resulting particularly when a number of machines, which had this electro-dynamic braking, were simultaneously operating on the same source of electrical power.

With these former difficulties clearly in mind it is the applicant's intent to provide an arrangement for stopping work spindles wherein the advantages of the electric motor for driving the work spindle is preserved but wherein the braking, accurate stopping of the work spindle at a predetermined position, and inching or jogging of the work spindle is effected by hydraulic operating and control means. By use of the arrangement a great simplification and cost saving is effected particularly in the formerly elaborate electrical equipment necessary to effect such results.

An object of this invention is to provide in a machine tool a means for rotating a work spindle at relatively high speed and a means in connection with said first mentioned means for rotating said work spindle at a predetermined slow speed when said first mentioned means is inoperative and to provide further means in connection with said second mentioned means for stopping said work spindle in a predetermined accurate position when rotating at said slow speed.

Another object is to provide in a machine tool a means for rotating a work spindle at relatively high speed and means in connection with said first mentioned means for slowing said spindle down to and rotating it at a predetermined slow speed when said first mentioned means is inoperative and to provide further means in connection with said second mentioned means for stopping said work spindle in a predetermined accurate position when rotating at said slow speed.

Another object is to provide in a machine tool a means for rotating a work spindle at relatively high speed and means in connection with said first mentioned means for slowing said spindle down to and rotating it at a predetermined slow speed when said first mentioned means is inoperative and to provide further means in connection with said second mentioned means for intermittently stopping and rotating said work spindle at said predetermined slow speed.

Another object is to provide an electric driving motor for rotating a work spindle and a hydraulic braking motor in connection with said electric motor for arresting rotation of the electric motor and work spindle and for bringing them to a stop at a definite predetermined position to facilitate loading and unloading of work in the work spindle.

Another object is also to provide in connection with a work spindle driven by an electric motor a hydraulic braking motor for jogging said spindle when the electric motor is inoperative.

And still another object is to provide in combination with a work spindle driven by an electric motor, a hydraulic braking motor for slowing down the rotation of the work spindle when the electric motor is rendered inoperative and to constantly rotate said spindle at a predetermined slow speed and at which speed said hydraulic braking motor may be rendered effective to accurately stop the work spindle at a definite predetermined position.

And a still further object is to provide in conjunction with the electrically driven and hydraulically controlled work spindle, an indexing plunger adapted to operate in conjunction with the work spindle when it is being rotated at a predetermined slow speed by said hydraulic braking motor, whereby the work spindle may be accurately stopped at a predetermined accurate indexed position.

Further objects and advantages of this invention will appear from the detailed description of the drawings in which—

Figure I is a circuit diagram of the electric-hydraulic operating and control mechanism shown diagrammatically applied to a center drive lathe.

Figure II is a diagrammatic representation of the electric driving motor, the hydraulic braking motor, and associated transmission mechanism of a typical double center drive lathe to which this invention may effectively be applied.

Figure III is a circuit diagram of the electric-hydraulic operating and control mechanism utilized in conjunction with a centrifugal control switch used in place of certain hydraulically operated mechanism.

Figure IV is a diagrammatic representation similar to Figure II but showing in addition the centrifugal switch driven by the electric driving motor for the work spindle.

For purposes of an exemplary disclosure the invention has been shown applied to a double center drive lathe of a character shown in Patent 2,069,107 dated January 26, 1937, the spindle driving arrangement for such a lathe being shown diagrammatically in Figure II comprising the work spindle 1 consisting of a pair of center drive ring gears 2 and 3 which are driven through suitable idler gears 4 by the pinions 5 fixed on the drive shaft 6. The drive shaft 6 is driven by the main drive electric motor 7 which has a pulley 8 mounted on its motor shaft 9 connected by suitable belts 10 to the driving pulley 11 mounted on the pulley shaft 12 upon which shaft is fixed the driving pinion 13 which drives the gear 14 fixed on the drive shaft 6 whereby the motor may rotate the center drive gears 2 and 3. Also connected to the shaft 9 is the hydraulic braking motor 15 which may be of the usual gear pump or piston pump type.

The supply of fluid pressure for the hydraulic control system may be derived from the usual hydraulic fluid pressure pump 16 driven by an electric motor 17 which draws fluid through the suction line 18 from the fluid reservoir 19 and delivers fluid under pressure through the pressure line 20. Drainage from a relief valve in the pump 16 for maintaining pressure in the line 20 is exhausted through the line 21 into the drain line 22 which returns fluid to the reservoir 19.

In the operation of the lathe when the main drive motor 7 is operating driving the work spindle 1 during the cutting operation, the hydraulic braking motor 15 is also being driven by the motor shaft 9. Under these conditions fluid is discharged from the exhaust port 23 of the braking motor 15 through the lines 24 and 25, passes freely through the relief valve 26, through the line 27, the solenoid operated control valve 28, which is normally spring set in neutral position at this time, into the line 29, and then through the line 30 back to the intake port 31 of the braking motor to form a closed circuit for free circulation of fluid at large volume when the electric motor 7 is running at full speed offering no resistance to the rotation of the braking motor 15. Fluid from this closed circuit may not escape through lines 32 and 33 because of the check valve 34 which only permits flow of fluid from the line 35 to the line 33. Nor may fluid escape through the line 36 from line 32 since this latter line is at all times closed off at the control valve 37 and serves only to supply fluid pressure for opening the valve 37 to connecting line 38 to the drain line 22, which connection is normally cut off by the spring set arrangement in the valve when the pressure drops in the line 36.

High pressure is maintained in the closed circulating circuit by pressure received from the pressure line 20 which passes through the speed control valve 39 which in turn discharges the high pressure fluid into the line 40 connected to said circuit at a definite relatively small volume for at all times maintaining the high pressure in the circuit and to make up for any leakage from said circuit. This discharge from the valve 39 is also utilized to rotate the hydraulic braking motor 15 at a definite slow speed for driving the electric motor 7 and the lathe spindle at slow speed preparatory to stopping said spindle or when jogging the spindle as will be described. The relief valve 26, while it at all times allows free flow between the lines 25 and 27, is so set at a pressure higher than that of the relief valve in the pump 16, or in other words than the pressure in the closed circuit, that fluid does not escape under these conditions through the bypass line 41, line 35, the check valve 42 and into the drain line 22.

Immediately upon disconnecting the electrical power from the motor 7 the otherwise inoperative limit switch LS—1 associated with the ring gear 2 becomes effective through the usual relays and contactors (not shown) and is engaged by a dog 43 on the center drive gear 2 to cause the solenoid B of the control valve 28 to be energized, operating the valve 28 so as to close off the line 29 and to connect line 27 to line 38. This causes the pressure to drop to substantially zero in the lines 30, 32, 33, and 36 because the intake volume through the port 31 of the braking motor 15, which is being driven at a high rate of speed by the momentum of the electric motor 7 and the associated driving transmission and work spindle, is far in excess of that which can be supplied by the valve 39 through the line 40. Dropping the pressure in the line 36 causes the valve 37 to operate by its spring to close off the line 38 thus preventing fluid from passing through the line 27. Extremely high pressure is momentarily built up in lines 24 and 25 until the momentum in the electric motor and spindle transmission is absorbed by bypassing fluid through the high pressure relief valve 26 into the line 41. The discharge through the line 41 passes through the line 35, through the check valve 34, and into the line 33 due to the suction action set up in the lines 33, 32, and 30 by the rapid intake of the hydraulic braking motor. The check valve 42, which is arranged to prevent flow from drain line 22 to line 35, maintains the suction action through the check valve 34.

The hydraulic braking motor 15 will continue to decelerate in bypassing fluid through the valve 26 until it has slowed down to a point where the volume taken into the intake port 31 is equal to that being supplied through the line 40 from the valve 39. The valve 26 is so set as to effect the deceleration about a half revolution of the work spindle. After the hydraulic braking motor 15 has decelerated to the above point pressure again builds up in the lines 30, 32, 33, and 36 and the motor 15 is driven at a relatively slow speed for similarly rotating the work spindle by fluid from the line 40. Building up pressure in the line 36 again opens the valve 37 connecting line 38 to the drain line 22, allowing free flow of fluid through line 27 thus eliminating all back pressure at the exhaust port 23 of the hydraulic braking motor 15 which would otherwise hinder the operation of said motor 15 at the predetermined slow speed.

As soon as the limit switch LS—1 is operated the otherwise inoperative limit switch LS—2 is then rendered in a condition to be effective when operated. The limit switch LS—2 is operated when the dog 44 carried on the ring gear 3 engages it as the work spindle is rotated at the predetermined slow speed by the hydraulic braking motor 15. Operation of the limit switch LS—2, through appropriate relays and contactors (not shown), causes the solenoid A of the control valve 28 to be operated which closes off the line 27 and connects the line 29 to the line 38. Flow through line 27 is thus stopped causing back pressure to substantially instantly build up in lines 24 and 25 to stop rotation of the hydraulic braking motor, and thus the work spindle center drive ring gears in a predetermined position depending on the setting of the dog 44 on the ring gear 3, from its slow rotating speed since the relief valve 26 is set at a greater pressure than that supplied to the port 31 of the motor 15 by the line 40. Substantially no fluid would escape through the line 41 from the valve 26 under these conditions, thus providing very accurate stopping of the ring gears. The valve 37 under these conditions will merely float on the line 38 since the control pressure in the line 36 will be determined by spring pressure setting of the valve 37.

When the main drive electric motor is again supplied with current solenoid A is de-energized and the valve 28 allowed to come to its spring set neutral position and both limit switches LS—1 and LS—2 are rendered ineffective by the usual electrical relays and contactors (not shown) so that the machine is then ready for repeating the above cycle of operation. The above arrangement is particularly adapted to crankshaft lathes having loading devices of a character shown in Patents 1,700,721, dated January 29, 1929; Re. 20,090, dated September 1, 1936; and 2,069,107, dated January 26, 1937.

When it is desired to jog the center drive gears 2 and 3 it is only necessary to provide suitable electrical means for cutting out the limit switches LS—1 and LS—2 and to alternately energize one or the other of the solenoids A and B of the control valve 28. When the solenoid B is energized the center drive gears rotate at a predetermined slow speed and when solenoid A is energized the center drive gears are substantially instantly stopped as described above.

Summarizing, the functions of the limit switches LS—1 and LS—2 are as follows:

(a) When the main drive motor 7 is energized to drive the work spindle or when it is desired to jog the center drive gears 3 and 4 suitable electrical control means renders both of the limit switches LS—1 and LS—2 ineffective though they continue to be actuated by the dogs 43 and 44 of the ring gears 2 and 3, when rotated by the motor 7.

(b) When power is disconnected from the main drive motor limit switch LS—1 is rendered effective, ready to perform its function the first time the dog 43 strikes it after power has been disconnected. Up to this point limit switch LS—2 is still ineffective.

(c) As soon as limit switch LS—1 has been rendered effective and immediately after it is struck by dog 43, limit switch LS—2 is rendered effective, ready to perform its function the first time dog 44 strikes it after dog 43 strikes limit switch LS—1.

In instances where it is desired to stop the work spindle in an accurate predetermined indexed position for purposes of utilizing certain types of loading and unloading arrangements for a lathe such for example as is shown in copending application Serial Number 209,738, filed May 24, 1938, an indexing plunger 45 adapted to engage an indexing disc 46 fixed to the gear 14 of the driving transmission for the work spindle is utilized. In such instances the use of the solenoid A and its functional effect on the control valve 28 are dispensed with and a second control valve 47 with an operating solenoid C is inserted in its place. The solenoid C is energized in the same way as the solenoid A by the limit switch LS—2 to operate the valve 47 so as to connect the fluid pressure line 20 to the line 48 to cause the indexing plunger 45 connected to the piston 49 in the cylinder 50 to be urged against the indexing disc 46. Exhaust fluid from the cylinder 50 under these conditions passes through line 51, the valve 47, and into the drain line 22. The dog 44 is arranged to operate the limit switch LS—2 just prior to the time when the notch in the indexing disc 46 is in position for engagement by the indexing plunger 45. Thus the plunger bears against the periphery of the indexing disc after limit switch LS—2 has operated, the plunger jumping into the slot as the spindle transmission is rotated at slow speed by the hydraulic braking motor to instantly arrest rotation of the spindle and stop it in accurate predetermined indexed position.

The solenoid D of the valve 47 is adapted to be energized to connect the pressure line 20 to the line 51 and line 48 to the drain line 22 for withdrawing the indexing plunger 45 from the indexing disc 46 whenever the main driving motor 7 is energized or when the hydraulic braking motor 7 is rotating the spindle transmission slowly during jogging operations. In order to prevent damage to the machine in the event the indexing plunger 45 would be inserted in the disc 46 before the spindle transmission had completely decelerated to the slow speed, a pressure controlled limit switch LS—3 is connected in series with the limit switch LS—2 and is operated by pressure in the lines 24 and 25 through its connecting line 52 so as to render the limit switch LS—2 inoperative so long as there is pressure in the lines 24 and 25 during deceleration of the lathe transmission, the pressure dropping to substantially zero in these lines to allow the limit switch LS—3 and LS—2 to operate only when the hydraulic braking motor 15 has completely decelerated and is being driven at the predetermined slow speed from the hydraulic pump 16 as described. When it is desired to effect jogging movements in the work spindle the solenoids A and B of the control valve 28 may be alternately operated as described during which time the solenoid D of the valve 47 is constantly energized to keep the indexing plunger 45 withdrawn from the disc 46.

Another arrangement for controlling a work spindle in the above manner is to utilize a centrifugal limit switch 53 in place of certain of the hydraulic mechanism used in the previously described method. Noting particularly Figures III and IV, this centrifugal switch 53 is driven by suitable means 54 from the shaft 9 of the main driving motor 7 and is arranged to control the operation of the solenoid B of the valve 28. When the main drive motor 7 is operating during the cutting cycle the hydraulic braking motor 15, which is driven by said motor 7, is circulating fluid out of exhaust port 23, through lines 24 and 25, the valve 26, line 27, the valve 28 (which is spring set in neutral position at this time), lines 29 and 55, through the check valve 56 and the line 30 returning to the intake port 31 of the braking motor 15. Pressure is maintained in this circulating circuit from the fluid pressure pump 16 through the line 20, the valve 39, and the line 40 in a manner as described in Figure I.

When the power supply is cut off from the motor 7 the limit switch LS—1 becomes immediately effective and when operated by the dog 43 on the ring 4 causes the solenoid A to be energized operating the valve 28 so that line 27 is shut off and line 29 is connected to the drain line 22. Pressure thus immediately builds up in lines 24 and 25 which causes fluid to bypass through the valve 26 into the line 57 connected to the line 30 so as to decelerate the lathe spindle transmission. After this transmission and the motor 7 have decelerated to a definite predetermined slow speed the centrifugal switch 53 is automatically operated de-energizing solenoid A and energizing solenoid B of the valve 28 so that line 27 is connected to the drain line 22 and line 29 is shut off. The braking motor 15 is thus driven at the predetermined speed from the pump 16 as described in Figure I the fluid pressure from line 40 passing through line 55, the check valve 56, and the line 30 into the intake port 31; the exhaust fluid passing into the drain line 22 through lines 24 and 25, valve 26, line 27, and the valve 28.

Immediately after limit switch LS—1 is operated limit switch LS—2 is rendered effective and when it is actuated by the dog 44 the solenoid A is again energized and the solenoid B de-energized whereby the line 27 is again cut off to effect final stopping of the braking motor and the spindle transmission. In cases where the final stopping is to be done by means of the indexing plunger 45 the limit switch LS—2 is not arranged to have any effect on the solenoid A but is adapted to control the solenoid C of the control valve 47 as in Figure I. Jogging of the work spindle by alternately energizing one or the other of the solenoids A and B of the control valve 28 and the solenoid D of the control valve 47 when the indexing plunger 45 is used is effected in the same manner as in Figure I.

Having thus fully set forth and described our invention what we claim as new and desire to secure by United States Letters Patent is:

1. In a machine tool, a rotatable work spindle, means for rotating said work spindle at relatively high speed, means in connection with said first mentioned means for slowing said spindle down to and rotating it at a predetermined slow speed when said first mentioned means is inoperative, and means in connection with said second mentioned means for stopping said work spindle in a predetermined accurate position when rotating at said slow speed.

2. In a machine tool, a rotatable work spindle, means for rotating said work spindle at relatively high speed, means in connection with said first mentioned means for slowing said spindle down to and rotating it at a predetermined slow speed when said first mentioned means is inoperative, and means in connection with said second mentioned means for intermittently stopping and rotating said work spindle at said predetermined slow speed.

3. In a machine tool, a rotatable work spindle, a driving motor for rotating said spindle, a hydraulic braking motor connected to and rotated by said driving motor, hydraulic control means associated with said braking motor for arresting rotation of the driving motor and work spindle when said driving motor is inoperative to bring said work spindle to a stop at a definite predetermined position.

4. In a machine tool, a rotatable work spindle, a driving motor for rotating said spindle, a hydraulic braking motor connected to and rotated by said driving motor, hydraulic control means associated with said braking motor to effect intermittent rotation and stopping of said driving motor and work spindle when said driving motor is inoperative.

5. In a machine tool, a rotatable work spindle, a driving motor for rotating said spindle, a hydraulic braking motor connected to and rotated by said driving motor, hydraulic control means associated with said braking motor to effect the slowing down of said driving motor and work spindle and to rotate said motor and spindle at a predetermined slow speed when said motor is inoperative, said hydraulic control means being effective when said motor and spindle are being rotated at said slow speed to effect accurate stopping of said work spindle at a definite predetermined position.

6. In a machine tool, a rotatable work spindle, a driving motor for rotating said spindle, a hydraulic braking motor connected to and rotated by said driving motor, hydraulic control means associated with said braking motor to effect the slowing down of said driving motor and work spindle and to rotate said motor and spindle at a predetermined slow speed when said motor is inoperative, an indexing plunger associated with said driving motor and spindle, said hydraulic control means being effective when said motor and spindle are being rotated at said slow speed to render said indexing plunger effective to accurately stop said spindle at a predetermined indexed position.

7. In a machine tool, a rotatable work spindle, a driving motor for rotating said work spindle, a hydraulic braking motor connected to and rotated by said driving motor, a fluid pressure pump for supplying fluid to said braking motor, means for driving said pump, hydraulic control means operative for arresting rotation of said braking motor, and hydraulic control means operative to cause said fluid pressure pump to drive said braking motor at a predetermined slow speed.

8. In a machine tool, a rotatable work spindle, a driving motor for rotating said work spindle, an indexing plunger associated with said spindle and driving motor, a hydraulic braking motor connected to and rotated by said driving motor, a fluid pressure pump for supplying fluid to said braking motor, means for driving said pump, hydraulic control means operative to cause said braking motor to slow down the rotation of said spindle and driving motor when said driving motor is rendered inoperative, hydraulic control means operative to cause said fluid pressure pump to drive said braking motor at a predetermined slow speed, and hydraulic control means to render said indexing plunger operative to accurately stop said work spindle in a predetermined indexed position.

9. In a machine tool, a rotatable work spindle, a driving motor for rotating said work spindle, a hydraulic braking motor connected to and rotated by said driving motor, a fluid pressure pump for supplying fluid to said braking motor, means for driving said pump, hydraulic control means effective when said driving motor is operating whereby said braking motor freely circulates fluid at relatively high volume and whereby relatively high pressure is maintained in said fluid while circulating by said fluid pressure pump, hydraulic control means effective at a predetermined position of rotation of the work spindle when said driving motor is inoperative to arrest rotation of said braking motor by preventing said free circulation of fluid, to thereby stop said spindle at a substantially accurate predetermined position.

10. In a machine tool, a rotatable work spindle, a driving motor for rotating said work spindle, a hydraulic braking motor connected to and rotated by said driving motor, a fluid pressure pump for supplying fluid to said braking motor, means for driving said pump, hydraulic control means effective when said driving motor is operating whereby said braking motor freely circulates fluid at relatively high volume and whereby relatively high pressure is maintained in said fluid while circulating by said fluid pressure pump, hydraulic control means effective at a predetermined position of rotation of the work spindle when said driving motor is inoperative to arrest rotation of said braking motor by preventing said free circulation of fluid, to decelerate said work spindle and driving motor, and hydraulic control means operable by the deceleration of said braking motor to cause said fluid pressure pump to rotate said work spindle at a predetermined slow speed.

11. In a machine tool, a rotatable work spindle, a driving motor for rotating said work spindle, a hydraulic braking motor connected to and rotated by said driving motor, a fluid pressure pump for supplying fluid to said braking motor, means for driving said pump, hydraulic control means effective when said driving motor is operating whereby said braking motor freely circulates fluid at relatively high volume and whereby relatively high pressure is maintained in said fluid while circulating by said fluid pressure pump, hydraulic control means effective at a predetermined position of rotation of the work spindle when said driving motor is inoperative to arrest rotation of said braking motor by preventing said free circulation of fluid, to decelerate said work spindle and driving motor, hydraulic control means operable by the deceleration of said braking motor to cause said fluid pressure pump to rotate said work spindle at a predetermined slow speed, and further hydraulic control means effective at a predetermined position of rotation of said work spindle when said driving motor is inoperative to arrest all rotation of said work spindle by preventing all circulation of fluid by said braking motor to accurately stop said work spindle at a predetermined position.

12. In a machine tool, a rotatable work spindle, a driving motor for rotating said work spindle, an indexing plunger associated with said work spindle and driving motor, a hydraulic braking motor connected to and rotated by said driving motor, a fluid pressure pump for supplying fluid to said braking motor, means for driving said pump, hydraulic control means effective when said driving motor is operating whereby said braking motor freely circulates fluid at a relatively high volume and whereby relatively high pressure is maintained in said fluid while circulating by said fluid pressure pump, hydraulic control means effective at a predetermined position of rotation of the work spindle when said driving motor is inoperative to decelerate said work spindle and driving motor, hydraulic control means operable by the deceleration of said braking motor to cause said fluid pressure pump to rotate said work spindle at a predetermined slow speed, and further hydraulic control means effective at a predetermined position of rotation of said work spindle when said driving motor is inoperative to render said indexing plunger operative to accurately stop said work spindle at a predetermined indexed position.

13. In a machine tool, a rotatable work spindle, a driving motor for rotating said work spindle, an indexing plunger associated with said work spindle and driving motor, a hydraulic braking motor connected to and rotated by said driving motor, a fluid pressure pump for supplying fluid to said braking motor, means for driving said pump, hydraulic control means effective when said driving motor is operating whereby said braking motor freely circulates fluid at a relatively high volume and whereby relatively high pressure is maintained in said fluid while circulating by said fluid pressure pump, hydraulic control means effective at a predetermined position of rotation of the work spindle when said driving motor is inoperative to decelerate said work spindle and driving motor, hydraulic control means operable by the deceleration of said braking motor to cause said fluid pressure pump to rotate said work spindle at a predetermined slow speed, further hydraulic control means effective at a predetermined position of rotation of said work spindle when said driving motor is inoperative to render said indexing plunger operative to accurately stop said work spindle at a predetermined indexed position, and means operable by the deceleration of said braking motor to render said last mentioned hydraulic control means ineffective unless said work spindle is rotating at said predetermined slow speed.

14. In a machine tool, a rotatable work spindle, a driving motor for rotating said work spindle, a hydraulic braking motor connected to and rotated by said driving motor, a fluid pressure pump for supplying fluid to said braking motor, means for driving said pump, hydraulic control means effective when said driving motor is operating whereby said braking motor freely circulates fluid at relatively high volume and whereby relatively high pressure is maintained in said fluid while circulating by said fluid pressure pump, hydraulic control means effective at a predetermined position of rotation of the work spindle when said driving motor is inoperative to arrest rotation of said braking motor by preventing said free circulation of fluid, to decelerate said work spindle and driving motor, hydraulic control means operable by the deceleration of said braking motor to cause said fluid pressure pump to rotate said work spindle at a predetermined slow speed, and further hydraulic control means effective at a predetermined position of rotation of said work spindle when said driving motor is inoperative to arrest all rotation of said work spindle by preventing all circulation of fluid by said braking motor to accurately stop said work spindle at a predetermined position, and means for alternately rendering said third mentioned and last mentioned hydraulic control means effective independently of said work spindle for jogging said work spindle when said driving motor is inoperative.

15. In a machine tool, a rotatable work spindle, a driving motor for rotating said work spindle, an indexing plunger associated with said work spindle and driving motor, a hydraulic braking motor connected to and rotated by said driving motor, a fluid pressure pump for supplying fluid to said braking motor, means for driving said pump, hydraulic control means effective when said driving motor is operating whereby said braking motor freely circulates fluid at a relatively high volume and whereby relatively high pressure is maintained in said fluid while circulating by said fluid pressure pump, hydraulic control means effective at a predetermined position of rotation of the work spindle when said driving motor is inoperative to decelerate said work spindle and driving motor, hydraulic control means operable by the deceleration of said braking motor to cause said fluid pressure pump to rotate said work spindle at a predetermined slow speed, and further hydraulic control means effective at a predetermined position of rotation of said work spindle when said driving motor is inoperative to render said indexing plunger operative to accurately stop said work spindle at a predetermined indexed position and means for rendering said further hydraulic control means ineffective when said second mentioned and third mentioned hydraulic control means are alternately rendered effective for jogging said work spindle when said driving motor is inoperative.

16. In a machine tool, a rotatable work spindle, a driving motor for rotating said work spindle, a hydraulic braking motor connected to and rotated by said driving motor, a fluid pressure pump for supplying fluid to said braking motor, means for driving said pump, hydraulic control means effective when said driving motor is operating whereby said braking motor freely circulates fluid at relatively high volume and whereby relatively high pressure is maintained in said fluid while circulating by said fluid pressure pump, hydraulic control means effective at a predetermined position of rotation of the work spindle when said driving motor is inoperative to arrest rotation of said braking motor by preventing said free circulation of fluid, to decelerate said work spindle and driving motor, and hydraulic control means operable by a centrifugal governor rotated by said driving motor to cause said fluid pump to become effective to rotate said work spindle at a predetermined slow speed when said spindle has decelerated to said predetermined slow speed.

WILLIAM F. GROENE.
HAROLD J. SIEKMANN.